United States Patent

Inubushi et al.

[11] 4,072,006
[45] Feb. 7, 1978

[54] CHEMICAL REACTION FURNACE SYSTEM

[75] Inventors: Masanobu Inubushi; Hajime Yamamoto; Osamu Nagata, all of Kobe, Japan

[73] Assignee: Kawasaki Jukogyo Kabushiki Kaisha, Kobe, Japan

[21] Appl. No.: 706,108

[22] Filed: July 16, 1976

[30] Foreign Application Priority Data

July 19, 1975  Japan .................................. 50-88559

[51] Int. Cl.$^2$ ........................... F02C 9/02; F02G 3/00
[52] U.S. Cl. .................................. 60/39.25; 60/39.01; 60/39.02; 60/39.03
[58] Field of Search .................... 60/39.25, 39.03, 660, 60/39.2, 39.21, 39.01, 39.02

[56] References Cited

U.S. PATENT DOCUMENTS

| 3,704,587 | 12/1972 | Krieb ................................... 60/39.25 |
| 3,747,335 | 7/1973 | Strub ................................... 60/39.03 |
| 3,777,486 | 12/1973 | Damratowski ................. 60/39.25 X |
| 3,990,230 | 11/1976 | Kuwashima ....................... 60/39.03 |

FOREIGN PATENT DOCUMENTS 391,180  12/1973  U.S.S.R. .............................. 60/39.25

*Primary Examiner*—Clarence R. Gordon
*Attorney, Agent, or Firm*—Haseltine, Lake & Waters

[57] ABSTRACT

A chemical reaction furnace system having a reaction furnace, a reaction gas exhaust flowpath, and a gas scrubbing device in the exhaust flowpath and having a capability of controlling the furnace top pressure is characterized by the provision of a turbine in the exhaust flowpath downstream from the scrubbing device and being operable to recover energy in the reaction gas, a gas bypass flowpath branched from said exhaust flowpath at a point thereof between the scrubbing device and the turbine and bypassing the turbine, and a bypass valve installed in the bypass flowpath, the turbine inlet gas pressure being controlled by a turbine governor.

6 Claims, 1 Drawing Figure

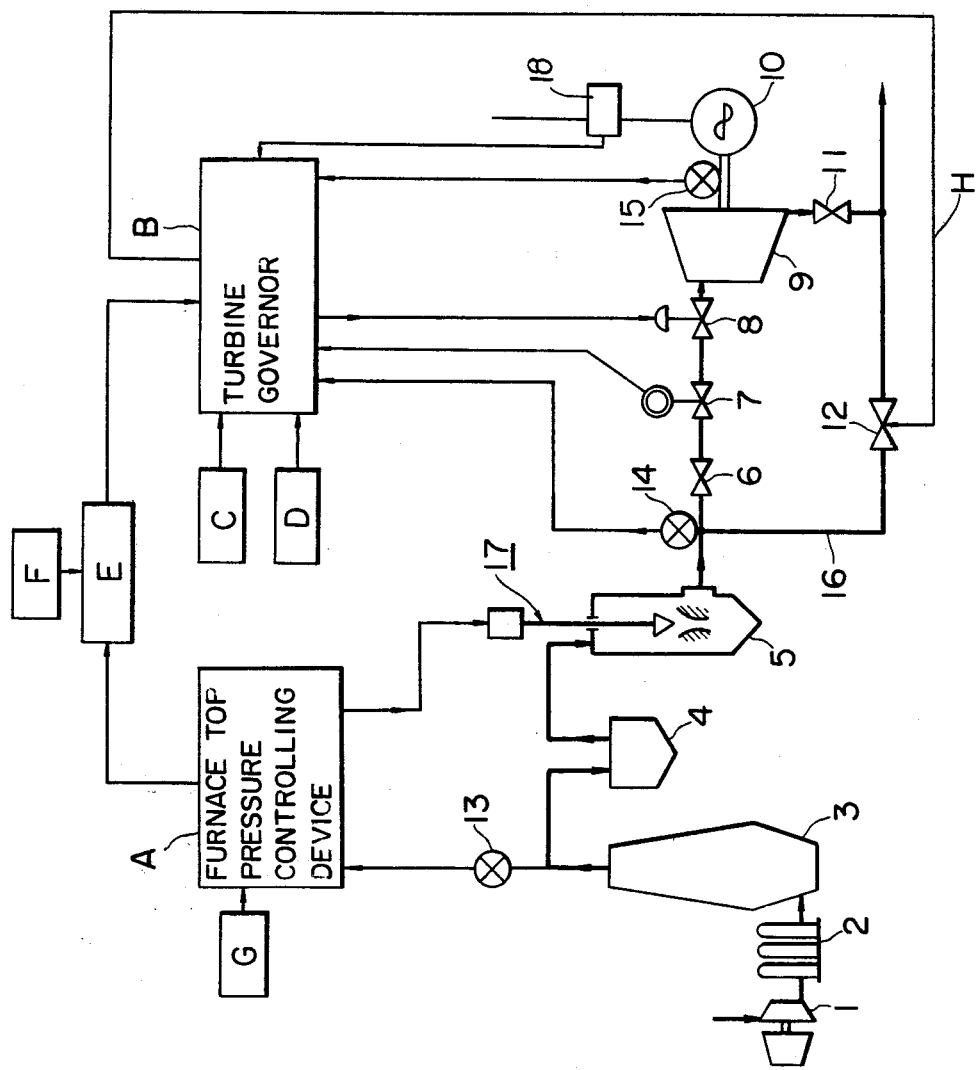

CHEMICAL REACTION FURNACE SYSTEM

BACKGROUND OF THE INVENTION

This invention relates generally to chemical reaction furnace systems and more particularly to a chemical reaction furnace system having a reaction furnace and a reaction gas scrubbing device possessing the capability of controlling the furnace top pressure of the reaction furnace.

SUMMARY OF THE INVENTION

It is an object of this invention to provide a chemical reaction furnace system of the above stated character in which, as control of the furnace top pressure is carried out by means of the reaction gas scrubbing device, a turbine-generator installed downstream therefrom is driven by the reaction gas discharged from the scrubbing device thereby to utilize effectively the energy possessed by the reaction gas.

Another object of the invention is to provide a chemical reaction furnace system as stated above in which, as the scrubbing effect of the reaction gas scrubbing device is maintained positively and regularly, the maximum gas pressure attainable at the turbine inlet is realized, and increase in the turbine heat drop is achieved thereby to obtain the maximum efficiency attainable in energy recovery.

Still another object of the invention is to provide, in a chemical reaction furnace system of the above stated character and functional capability, an uncontrolled bypass valve thereby not only to accomplish changeover and regulation of the gas flow rate at the time of starting and stopping the turbine but also to assure protection of the reaction furnace and turbine-generator when the system assumes an abnormal operational state.

According to this invention, briefly summarized, there is provided a chemical reaction furnace system having a reaction furnace, a reaction gas main flowpath for conducting reaction gas away from the furnace top of the furnace, and a reaction gas scrubbing device installed in said main flowpath, furnace top pressure controlling device associated with the scrubbing device, an expansion turbine provided in the gas main flowpath downstream from the scrubbing device and being operable to utilize energy in the reaction gas, a gas bypass flowpath branched from the main flowpath at a point thereof between the scrubbing device and the turbine and bypassing the turbine, a bypass valve installed in the bypass flowpath, and a turbine governor for controlling turbine inlet gas pressure.

The nature, principles, utility, and further features of this invention will be apparent from the following detailed description with respect to a preferred embodiment of the invention when read in conjunction with the accompanying drawing.

In the following disclosure of the organization and operation of the chemical reaction furnace system according to this invention, a system relating to the operation of a blast furnace is selected as being the most generally representative example thereof. It should be understood, however, that the system of this invention is not limited to blast furnace operation systems.

BRIEF DESCRIPTION OF THE DRAWING

In the drawing:

The single FIGURE is a schematic flow diagram showing the essential organization of one example of a blast furnace system selected as one example of the chemical reaction furnace system according to this invention.

DETAILED DESCRIPTION OF THE INVENTION

Referring to the drawing the blast furnace system illustrated therein has a blast furnace 3 supplied with a hot air blast by an air blower 1 and a hot-air furnace 2. The furnace exhaust gas is discharged from the top of the blast furnace 3 and, after being passed successively through a dust collector 4 and a gas scrubbing device 5 capable of controlling the furnace top pressure, is fed by way of a turbine inlet valve 6, a main shut-off valve 7, and a speed-regulating valve 8 to a turbine 9 driven by this furnace gas.

The flow rate of the reaction gas through the gas scrubbing device 5 is controlled by control means 17, which is operable in response to a control signal from a furnace top pressure controlling device A of a control described hereinafter. The furnace top pressure of the furnace 3 varies inversely with this gas flowrate and, therefore, can be controlled by the controlling device A through the control means 17 of the scrubbing device 5.

The turbine 9 is coupled directly to and drives a generator 10. An outlet stop valve 11 is provided in the turbine exhaust gas line. A bypass gas flow line 16 having a bypass valve 12 therein is connected at one end to the turbine inlet at a point upstream from the turbine inlet valve 6 and at the other end to the turbine exhaust gas line at a point downstream from the outlet stop valve 11.

The above described gas-flow system is provided with a furnace top pressure detector 13 installed at the furnace gas outlet at the top of the blast furnace 3, a turbine inlet pressure detector 14 installed at the inlet of the turbine 9 at a point in the gas flow line upstream from the turbine inlet valve 6, and a turbine rotational speed (tachometric) detector 15 installed at a suitable point to detect the speed of the turbine or generator shaft.

The furnace top pressure controlling device A receives detection signals from the furnace top pressure detector 13 and has a furnace top pressure setter G for carrying out the setting with respect to the controlling device A. Operatively associated with the furnace top pressure controlling device A, is a control system for cooperatively operating with the above-mentioned detectors 14 and 15 to control the operation of the turbine system; a turbine governor B receiving detection signals from the turbine inlet pressure detector 14 and the turbine rotational speed detector 15; a turbine inlet pressure setter C for carrying out setting with respect to the turbine governor B; a load limit setter D for carrying out setting also with respect to the turbine governor B; a turbine inlet pressure set value upper limiter E for carrying out limiting operation with respect to the turbine governor B; a minimum differential pressure setter F for carrying out setting with respect to the limiter E, operative information also being fed to the limiter E from the furnace top pressure controlling device A; and a feedforward signal circuit connected between the turbine governor B and the bypass valve 12.

In the blast-furnace system of the above described general organization, the turbine 9 is operated only when the blast furnace 3 has assumed a stable high-pressure operational state. Accordingly, at the time of start-up of the blast-furnace operation and at the time when there is no air flow, the turbine 9 is stopped, and the main shut-off valve 7 and the speed regulating valve 8 are in their fully-closed state, whereby all of the blast furnace generated gas flows through the bypass line 16 and bypass valve 12 in fully-opened state. The furnace top pressure at this time is being controlled at a constant value by the furnace top pressure controlling function of the gas scrubbing device 5.

As a general rule, the turbine-generator is operated by parallel loading with an outside power supply. During the operation of the turbine 9, the bypass valve 12 is maintained in its fully-closed state, and the entire quantity of the generated gas of the blast furnace 3 is caused to flow through the turbine 9 thereby to effectively recover the energy possessed by this gas. At the same time, the turbine inlet pressure is controlled by the regulating valve 8 under the control of the turbine governor B and maintained at the highest possible value at which the scrubbing performance of the gas scrubbing device 5 can be maintained thereby to increase the heat drop in the turbine and to increase the recovered energy. The furnace top pressure at this time is controlled at a constant value by the gas scrubbing device 5, and, furthermore, the rotational speed of the turbine 9 is synchronized with that of the outside power supply and thus maintained at a constant value.

The various modes of operation of the turbine applied to the system of this invention are as follows.

1-1. Normal Operation 1-1-1. Starting the turbine

It will first be assumed that the bypass valve 12 is fully open, that the turbine 9 is stopped, and that the entire quantity of the generated gas from the blast furnace is not passing through the turbine 9 but is passing through the bypass valve 12. The furnace top pressure in this case is being controlled by the gas scrubbing device 5.

When a command for starting the turbine is issued, the turbine inlet valve 6 and the outlet stop valve 11 are opened, and gas is passed through the turbine as a preparatory turbine starting step. The turbine starting procedure is carried out in sequence as follows.

First, the main shut-off valve 7 is opened, and then, by means of the load limit setter D, the speed-regulating valve 8 is gradually opened through the turbine governor B until it is fully opened. At the same time, the bypass valve 12 is gradually closed and is then tentatively held at a constant degree of opening at the time instant when the turbine inlet pressure reaches an appropriate value. At this time, the turbine 9 is gradually accelerated until it reaches the minimum set rotational speed of the rotational speed control of the turbine governor B, whereupon the turbine 9 is placed under speed control.

At this point, the synchronizing of the turbine with the outside power supply is carried out automatically or manually. When synchronization has been attained, a turbine inlet pressure control circuit of the turbine governor B, which has been inoperative up to this time, automatically becomes operative, and the operation of the turbine is placed under turbine inlet pressure control.

1-1-2. Load application

In order to apply load to the turbine, the bypass valve 12 is further closed from its state for synchronization until it is fully closed, whereupon the entire flow quantity of the blast furnace generated gas flows through the turbine 9. Next, the turbine inlet pressure setter C is manipulatively controlled to raise the turbine inlet pressure set value of the turbine governor B, whereupon the regulating valve 8 is operated and the turbine inlet pressure rises in response to this control action, whereby the turbine load further increases.

In this case, even if the set value of the turbine inlet pressure setter C is raised to the maximum value, the turbine inlet pressure set value will never exceed the pressure value which results from subtracting the set differential pressure between the inlet and outlet of the gas scrubbing device 5 set by the minimum differential pressure setter F from the furnace top pressure set value due to the furnace top pressure setter G as a result of the limiting action of the turbine inlet pressure set value upper limiter E. As a consequence, the scrubbing function of the gas scrubbing device 5 is continually maintained in normal state.

1-1-3. Stopping the turbine

Upon reception of a command for stopping the turbine, the bypass valve 12 is gradually opened, whereupon the turbine inlet pressure begins to decrease. When the turbine load becomes zero, the generator 10 automatically becomes disconnected from the outside power supply, and the control of the operation of the turbine is changed over from turbine inlet pressure control to speed control.

The bypass valve 12 is further opened until it is fully opened, and the main shut-off valve 7 is closed, whereupon the turbine 9 stops. The blast furnace generated gas at this time is not passing through the turbine 9, and its entire flow quantity is flowing through the bypass valve 12.

1-2. Abnormal Operation 1-2-1. Turbine tripping and load cut-off

In this case, the generator 10 is disconnected from the outside power supply at a circuit breaker 18, and the main shut-off valve 7 and/or the speed-regulating valve 8 rapidly closed thereby to protect the turbine 9 and the generator 10. At this time, the turbine inlet pressure rises rapidly, and, in concert with this rise, the furnace top pressure also rises. As a measure for preventing excessive pressure rise, a feed-forward compensation circuit H is provided which operates to open the bypass valve 12 in response to a turbine tripping or load shut-off signal sent to the turbine governor B from the shut-off valve 7 or the circuit breaker 17, respectively.

1-2-2. Blast furnace blow-by

In the event of an occurrence such as a blow-by of the blast furnace 3 during the operation of the turbine 9 with the result that a large quantity of the blast furnace gas flows instantaneously into the turbine, the furnace top pressure, will rise as a natural consequence. If the furnace top pressure becomes excessively high, a bleeder valve installed at the blast furnace will blow, but this can be prevented and overcome by installing in combination an abnormal bypass valve operating device adapted to open the bypass valve 12 upon detection of excessively high furnace top pressure.

Thus, in the chemical reaction furnace system according to this invention of the organization and operation as described above, the reaction gas discharged from the gas scrubbing device 5 is utilized to drive a turbine-generator installed downstream therefrom while furnace top pressure control is carried out by the gas scrubbing device, whereby the energy possessed by the reaction gas can be effectively utilized.

Furthermore, the maximum attainable gas pressure of the turbine inlet is realized as the scrubbing effectiveness of the reaction gas scrubbing device is maintained in a positive, steady-state manner, and the turbine heat drop is increased, whereby it is possible to achieve maximum possible efficiency of energy recovery. In addition, as a result of the installation of the bypass valve, there are afforded not only the possibility of changing over and adjusting of the gas flow rate at the time of starting and stopping the turbine but also many other unique features such as positive protection of the reaction furnace and the turbine-generator combination when the system is in an abnormal operational state.

While it is obvious that, when applied to a blast furnace system of an iron and steel manufacturing plant, the chemical reaction furnace system according to this invention as described above exhibits remarkable effectiveness, it will also be apparent that this system is similarly highly effective when applied to other general systems such as a chemical plant system comprising in combination a chemical reaction vessel which discharges high-pressure gas containing dust and an expansion turbine driven by the high-pressure gas.

We claim:

1. A chemical reaction furnace apparatus having a reaction furnace (3), a reaction gas main flowpath for conducting reaction gas away from the top of the reaction furnace, and a reaction gas scrubbing device (5) installed in said main flowpath and being adapted to control the presence of the reaction gas in the top of the reaction furnace, said apparatus comprising: an expansion turbine (9) provided in the gas main flowpath downstream from said scrubbing device (5) and being operable to utilize energy in the reaction gas; a gas bypass flowpath (16) branched from said main flowpath at a point between said scrubbing device (5) and said turbine (9) and bypassing the turbine; a bypass valve (12) disposed in said bypass flowpath; a turbine inlet pressure detector (14) for detecting inlet gas pressure of the turbine; a turbine speed regulating valve (8) installed in said main flowpath between said detector (14) and said turbine (9); and a turbine governor (B) receiving a signal from said detector (14) to control said turbine speed regulating valve (8) for maintaining the inlet gas pressure of the turbine at the highest possible value at which the scrubbing performance of said scrubbing device (5) can be maintained.

2. An apparatus as claimed in claim 1, including: a turbine inlet pressure set value upper limiter (E) for receiving a furnace top pressure signal from a furnace top pressure controlling device (A) being in cooperative working relation with said turbine governor (B) to suppress the turbine inlet gas pressure set in said governor to a value equal to the difference between a set differential pressure between the inlet and outlet of said gas scrubbing device (5) and from furnace top pressure set in the furnace top pressure controlling device (A).

3. An apparatus as claimed in claim 2, including: feed-forward compensation means (H) adapted to cooperate with said turbine governor (B) and said bypass valve (12) for opening the bypass valve upon receiving a turbine tripping or load shut-off signal.

4. An apparatus as claimed in claim 1, including: a speed detector (15) for detecting turbine rotational speed, said speed detector (15) being associated with said turbine governor (B) for sending a turbine rotational speed signal thereto, said turbine governor being operative to control said turbine speed regulating valve (8) in response to said turbine rotational speed signal when the turbine is not under control of said turbine inlet pressure detector (14).

5. An apparatus as claimed in claim 4, including: a turbine inlet pressure setter (C) and a turbine load limit setter (D), said setters being associated with said turbine governor (B).

6. An apparatus as claimed in claim 2, wherein: said turbine inlet pressure set value upper limiter (E) has associated therewith a minimum differential pressure setter (F) for carrying out setting with respect to the limiter (E).

* * * * *